United States Patent [19]
Noda

[11] 3,737,216
[45] June 5, 1973

[54] TRIPLE MIRROR FOR EYE MAKE-UP-CURVED

[76] Inventor: Meigo Noda, 3665 Shinyashida-cho, Kohoku-ku, Yokohama, Japan

[22] Filed: Dec. 16, 1971

[21] Appl. No.: 208,964

[30] Foreign Application Priority Data

Oct. 1, 1971    Japan ........................... 46/90744

[52] U.S. Cl. .................................... 350/306, 132/83
[51] Int. Cl. ............................................... G02b 5/08
[58] Field of Search ...................... 350/288, 299, 305, 350/306; 132/3

[56] References Cited

UNITED STATES PATENTS

| | | | |
|---|---|---|---|
| 3,620,605 | 11/1971 | Clark | 350/305 |
| 1,951,214 | 3/1934 | Schlumbohm | 350/306 |
| 2,025,971 | 12/1935 | Callowhill | 350/306 |

*Primary Examiner*—Ronald L. Wibert
*Assistant Examiner*—Michael J. Tokar
*Attorney*—George B. Oujevolk

[57] ABSTRACT

A triple mirror for eye make-up wherein a cover, to the inside of the roof of which two plane mirrors are attached inclined to each other, is joined with a triple mirror body having a plane mirror on the surface of its inclined portion and holes on its horizontal portion, in such a way that said cover can be freely folded and unfolded, and which is so constructed that, when said cover is unfolded, said plane mirror of said triple mirror body and said two triple mirrors of said cover form a triple mirror having a specified angle.

1 Claim, 2 Drawing Figures

PATENTED JUN 5 1973 3,737,216

TRIPLE MIRROR FOR EYE MAKE-UP-CURVED

BACKGROUND OF THE INVENTION

The present invention relates to a triple mirror for eye make-up, and more particularly to a triple mirror for eye make-up used by women in general and actresses in making up the edges of their eyes.

In conventional triple mirrors for eye make-up, three plane mirrors are all fixed to a triple mirror body, which makes it very bulky and inconvenient to carry. Another inconvenience of such triple mirrors is that they have no space in which to keep articles necessary for eye make-up.

The object of this invention is to overcome these drawbacks of the conventional triple mirrors for eye make-up.

That is, it is an object of the present invention to provide an improved type of triple mirror for eye make-up compact and convenient to carry, which is composed of a triple mirror body and a cover, the triple mirror body having a plane mirror attached to it, and the cover having two plane mirrors attached to it; and which is so made that, while it is not being used, it can be kept folded like a hinged double shell of a bivalve.

Another object of the present invention is to provide an improved type of triple mirror for eye make-up having holes in the horizontal portion of its triple mirror body for keeping articles necessary for eye make-up.

SUMMARY OF THE INVENTION

Briefly, a triple mirror for eye make-up according to this invention comprises a triple mirror body having a plane mirror attached to the surface of its inclined portion and holes in its horizontal portion, and a cover, to the inside of the roof of which are attached two plane mirrors inclined to each other.

The cover is joined with the triple mirror body in such a way that it can be freely folded and unfolded over the triple mirror body, and when the cover is unfolded, the plane mirror of the triple mirror body and the two plane mirrors of the cover form a triple mirror having a specified angle.

In a preferred embodiment of the invention, the angle between each two adjacent plane mirrors of the three plane mirrors is preferably about 110°, but it is not limited to this angle.

BRIEF DESCRIPTION OF THE DRAWING

The nature and objects of the invention will be more fully apparent from the following detailed description of preferred embodiments thereof, taken in connection with the accompanying drawings in which.

DETAILED DESCRIPTION

Figure 1:
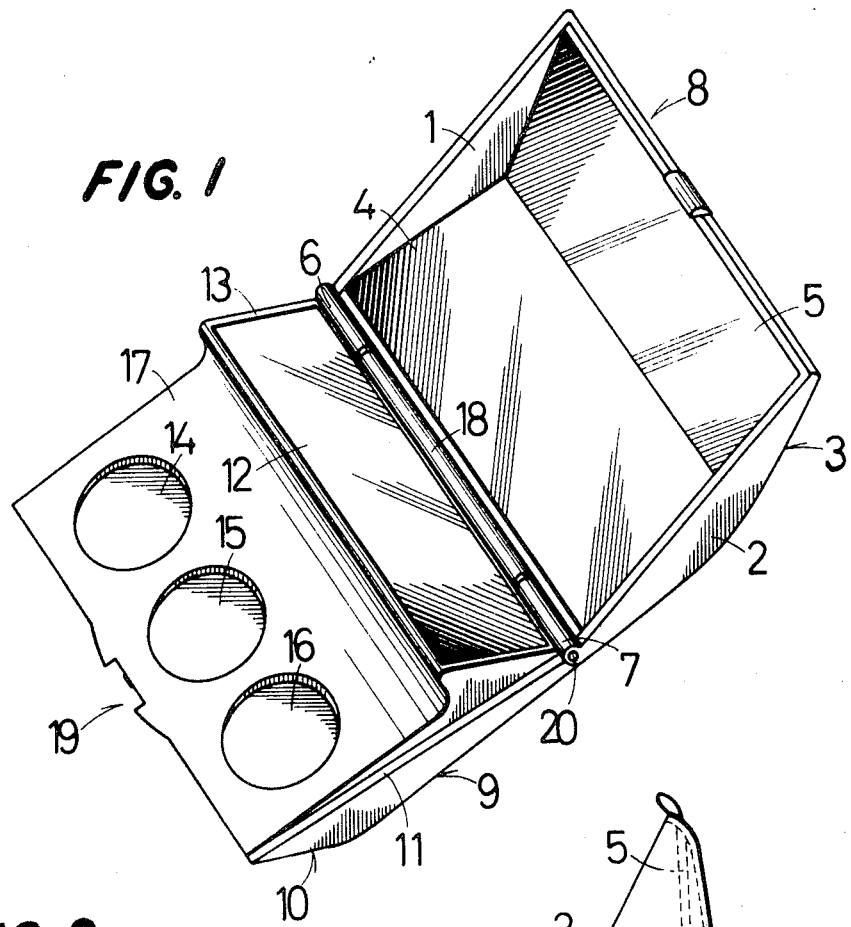
FIG. 1 is a perspective view of the triple mirror for eye make-up embodying the present invention with its cover unfolded.
Figure 2:
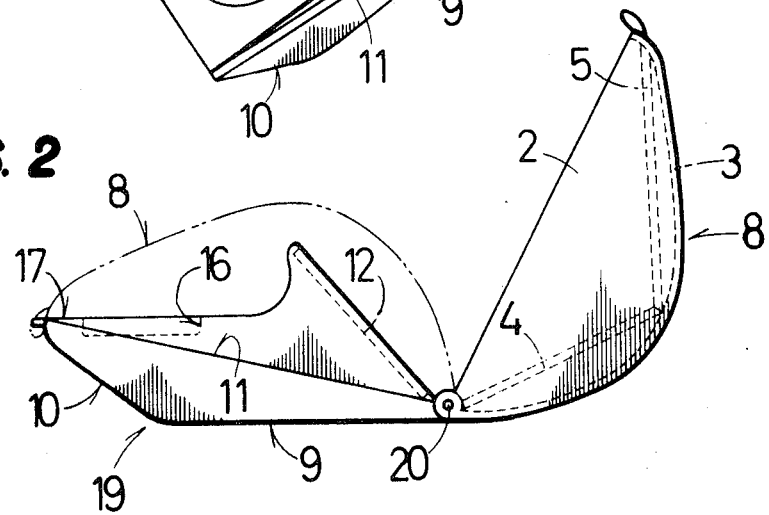
FIG. 2 is a side elevation of the triple mirror for eye make-up.

Referring to FIG. 1 and FIG. 2, the triple mirror for eye make-up comprises a cover 8 and a triple mirror body 19.

The cover 8 is composed of a pair of side walls 1, 2 and a curved roof 3 in the shape of the bottom of a ship. To the inside of the roof 3 are attached two plane mirrors 4, 5 inclined to each other, and at the lower end of the roof 3 are a pair of bearings, 6, 7.

At the fore end of a horizontal bottom of the triple mirror body 19 is an inclined fore wall 10, and from the right and left side portions at the rear end of the horizontal bottom 9 to the upper end of the fore wall 10 extend a pair of supporting portions 11, 11 to support the pair of side walls 1, 2 of the cover 8.

Between the pair of the supporting portions 11, 11 of the triple mirror body 19, and from the rear end of the horizontal bottom 9 rises forward the inclined portion 13, to the sloping surface of which is attached a plane mirror 12.

Between the pair of the supporting portions 11, 11 of the triple mirror body 19, and from the upper end of the fore wall 10 is a horizontal portion 17, in the horizontal surface of which are holes 14, 15, 16.

In the middle of the rear end of the horizontal portion 9 is provided a bearing 18.

The cover 8 and the triple mirror body 19 are joined by a pin 20 inserted through the bearings 6, 7, 18, so that the cover 8 may be folded and unfolded freely over the triple mirror body 19.

The cover 8 is so designed that, when it is unfolded and a triple mirror is formed, the cover 8 stops at a position where the angle between its plane mirror 4 and the plane mirror 12 of the triple mirror body 19 is about 110°.

As shown in phantom lines in FIG. 2, the cover 8 can be closed over the triple mirror body 19 like a double hinged shell of a bivalve.

This triple mirror being thus constructed, when the cover 8 is unfolded for eye make-up, the two plane mirrors 4, 5 of the cover 8 and the plane mirror 12 of the triple mirror body 19 form a triple mirror, and by bringing the eye close over the triple mirror and looking at each of the plane mirrors 4, 5, 12, it is possible to observe the make-up condition of the front part, upper side and lower side of the edge of the eye, and thus make up the eye easily.

Into the holes formed in the horizontal portion 17 of the triple mirror body 19 can be put various articles necessary for eye make-up, such as false eye-lashes and the like.

While the triple mirror is not being used, the cover 8 can be kept closed over the triple mirror body 19 like a double hinged shell of a bivalve, so that it is possible to make it compact and convenient for carrying.

Although the invention has been particularly shown and described, it is contemplated that various changes and modification may be made without departing from the scope of the invention as set forth in the following claims.

Thus, for example, the shape and number of the holes 14, 15, 16 of the triple mirror for eye make-up according to this invention is not limited to those which are shown in the Figure.

I claim:

1. A triple mirror for eye make-up which comprises:
   a. a cover (8) with a pair of side walls (1, 2) and a curved roof 3, having inside said roof (3) first and second plane mirrors (4, 5) inclined to each other;
   b. a triple mirror body (19) having an inclined fore wall (10) at the outer end of a horizontal bottom (9);
   c. a pair of supporting portions (11, 11) disposed to support said pair of side walls (1, 2) when said cover is closed over said triple mirror body, said supporting portions (11, 11) rising from the right and left side portions of the rear end of said horizontal bottom (9) to the upper end of said fore wall 10;

d. a sloping portion (13) between said pair of supporting portions (11, 11) which sloping portion rises forward from the rear end of said horizontal bottom (9) and to which a plane mirror (12) is attached;

e. a horizontal portion (17) between said pair of supporting portions (11, 11) said horizontal portion (17) extending horizontally from the upper end of said fore walls (10) and having holes (14, 15, 16) for cosmetics; and, f. a pair of bearings (6, 7) at the lower end of said roof (3) with a bearing (18) in the middle of the rear end of said horizontal bottom (9), said cover (8) and said triple mirror body (19) being joined by a pin (20) inserted through said bearings (6, 7, 18) whereby when said cover 8 is unfolded and said horizontal bottom (9) is placed on a table said curved roof (3) of said cover will be so disposed with respect to said horizontal bottom (9) that said plane mirror (12) of said triple mirror body (19) and said two plane mirrors (4, 5) of said cover (8) form a triple mirror having a predetermined angle.

* * * * *